US012681945B2

(12) United States Patent
Lin

(10) Patent No.: US 12,681,945 B2
(45) Date of Patent: Jul. 14, 2026

(54) MULTI-RESULT ARTIFICIAL INTELLIGENCE SYSTEM

(71) Applicant: OXTI Pte Ltd, Singapore (SG)

(72) Inventor: Yu-Lin Lin, Singapore (SG)

(73) Assignee: OXTI PTE LTD, Singapore (SG)

( * ) Notice: Subject to any disclaimer, the term of this patent is extended or adjusted under 35 U.S.C. 154(b) by 0 days.

(21) Appl. No.: 19/007,590

(22) Filed: Jan. 2, 2025

(65) Prior Publication Data

US 2026/0187088 A1     Jul. 2, 2026

(51) Int. Cl.
*G06F 16/248* (2019.01)
*G06Q 20/40* (2012.01)

(52) U.S. Cl.
CPC ....... *G06F 16/248* (2019.01); *G06Q 20/4014* (2013.01)

(58) Field of Classification Search
None
See application file for complete search history.

(56) References Cited

U.S. PATENT DOCUMENTS

| | | | | |
|---|---|---|---|---|
| 12,316,715 | B2 * | 5/2025 | Taheri | H04L 67/55 |
| 12,450,246 | B2 * | 10/2025 | Basu | G06N 20/00 |
| 12,456,463 | B2 * | 10/2025 | Sahoo | G10L 15/30 |
| 12,488,348 | B1 * | 12/2025 | Joshi | G06N 20/00 |
| 12,579,239 | B2 * | 3/2026 | Smets | G06F 21/32 |
| 2024/0428008 | A1 * | 12/2024 | Abraham | G06F 16/3329 |
| 2025/0094325 | A1 * | 3/2025 | Wuest | G06F 11/3684 |
| 2025/0104136 | A1 * | 3/2025 | Rawal | G06Q 30/0645 |
| 2025/0119479 | A1 * | 4/2025 | Taheri | H04L 51/222 |
| 2025/0310336 | A1 * | 10/2025 | Medina | H04L 63/20 |
| 2025/0378472 | A1 * | 12/2025 | Welinder | G06Q 30/0282 |
| 2026/0065228 | A1 * | 3/2026 | Lu | G06F 9/451 |
| 2026/0080222 | A1 * | 3/2026 | Nicholson | G06N 3/0475 |
| 2026/0084692 | A1 * | 3/2026 | Park | B60W 30/06 |
| 2026/0086513 | A1 * | 3/2026 | Naujoks | G05B 13/042 |
| 2026/0087401 | A1 * | 3/2026 | Naujoks | G06N 20/00 |
| 2026/0087829 | A1 * | 3/2026 | Gupta | G06V 20/588 |
| 2026/0089128 | A1 * | 3/2026 | Pathak | H04L 51/10 |

OTHER PUBLICATIONS

The state of artificial intelligence-based FDA approved medical devices and algorithms: an online database (Year: 2020).*
Rethinking Mobile AI Ecosystem in the LLM Era (Year: 2023).*

* cited by examiner

*Primary Examiner* — Kim T Nguyen
(74) *Attorney, Agent, or Firm* — Leong C. Lei

(57) ABSTRACT

The multi-result artificial intelligence (AI) system includes a registration module, an initialization module, an input module, a processing module, a result generation module, and a result display module. The registration module is for users to register a device type or a payment type. The initialization module is connected to the registration module, which configures multiple different AI models based on the registered device type or payment type, with each AI model being based on a Large Language Model (LLM). The input module is connected to the initialization module to receive a user request. The processing module is connected to the input module for distributing the user request to the AI models. The result generation module is connected to the processing module for generating multiple results from the user request using the AI models. The result display module is connected to the result generation module to display the results.

7 Claims, 5 Drawing Sheets

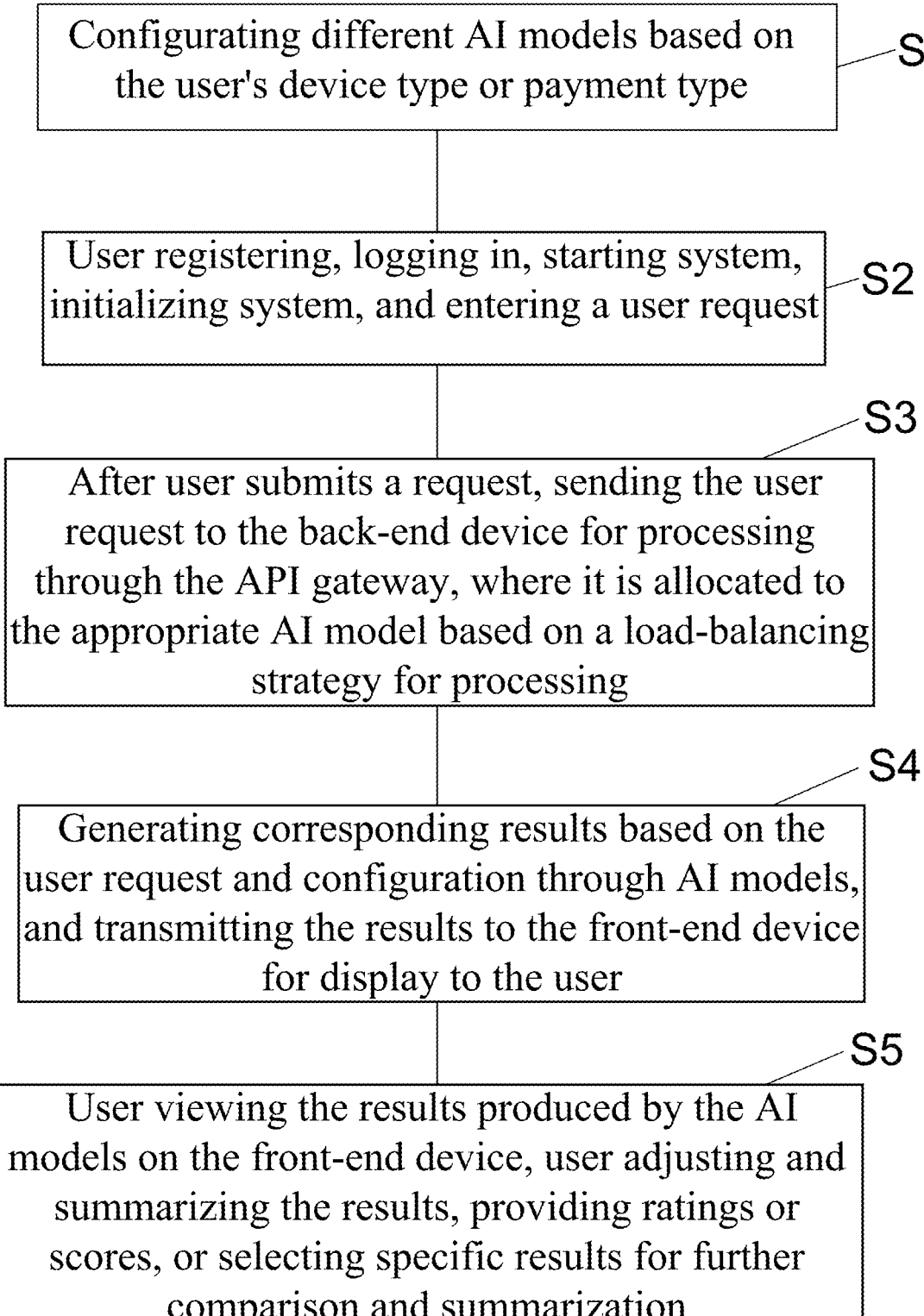

Configurating different AI models based on the user's device type or payment type — S1

User registering, logging in, starting system, initializing system, and entering a user request — S2

S3 — After user submits a request, sending the user request to the back-end device for processing through the API gateway, where it is allocated to the appropriate AI model based on a load-balancing strategy for processing S4 — Generating corresponding results based on the user request and configuration through AI models, and transmitting the results to the front-end device for display to the user S5 — User viewing the results produced by the AI models on the front-end device, user adjusting and summarizing the results, providing ratings or scores, or selecting specific results for further comparison and summarization

FIG. 3

MULTI-RESULT ARTIFICIAL INTELLIGENCE SYSTEM

BACKGROUND OF THE INVENTION

(a) Technical Field of the Invention

The present invention generally relates to artificial intelligence, and more particularly to an artificial intelligence system capable of producing multiple results to reduce errors.

(b) Description of the Prior Art

Artificial Intelligence (AI) systems refer to computer systems that simulate human intelligence, designed to perform tasks requiring human-like thinking, such as learning, reasoning, understanding, decision-making, language processing, perception, and interaction. These systems typically operate based on technologies like machine learning, deep learning, natural language processing (NLP), and computer vision, and can accomplish various tasks depending on the application scenarios.

For example, Republic of China, Taiwan, Patent No. 1823785 discloses "a method for ranking the best answers to benevolent questions using generative artificial intelligence." This method includes the following steps: providing a customer-owned system; receiving a first inquiry through the customer-owned system; obtaining an answer to the first inquiry from a generative AI server via the customer-owned system, where the generative AI server is connected to the customer-owned system through internet communication; returning the answer obtained from the generative AI server to the customer-owned system, and using the answer as a second inquiry to conduct a search within the customer-owned system; searching for documents related to the second inquiry through the customer-owned system; and performing relevance ranking on the related documents.

As shown in FIG. 3 of the aforementioned patent, this prior technology employs a single AI model from a generative AI server. This Chat Generative Pre-trained Transformer (ChatGPT) model is a conversational AI model developed based on a Large Language Model (LLM), and exhibits the following characteristics: (1) language simulation rather than true understanding: LLMs primarily rely on statistical patterns and data learning, enabling them to generate text that adheres to language rules but does not truly comprehend the intentions or logic behind the text; (2) lack of common-sense reasoning: while LLMs can provide reasonable responses in most scenarios, their understanding of common-sense or general knowledge remains flawed and, at times, their answers may contain logical errors or misunderstand the question; and (3) bias in training data: LLMs are trained on vast amounts of textual data, which may include various biases from human society, such as gender, racial, or cultural biases, thereby generating biased, discriminatory, or inappropriate content. Thus, relying on a single AI model to produce a result increases the likelihood of generating incorrect outcomes.

SUMMARY OF THE INVENTION

To overcome the above shortcoming, the present invention discloses a multi-result artificial intelligence (AI) system, which includes a registration module, an initialization module, an input module, a processing module, a result generation module, and a result display module. The registration module is for users to register a device type or a payment type. The initialization module is connected to the registration module, which configures multiple different AI models based on the registered device type or payment type, with each AI model being based on a Large Language Model (LLM). The input module is connected to the initialization module to receive a user request. The processing module is connected to the input module for distributing the user request to the AI models. The result generation module is connected to the processing module for generating multiple results from the user request using the AI models. The result display module is connected to the result generation module to display the results.

Additionally, the multi-result AI system may further include a storage module connected to the result display module for saving the user request and the results.

Specifically, the AI models include Chat Generative Pre-trained Transformer (ChatGPT), Gemini, and Shunfei.

Specifically, the processing module uses an Application Programming Interface (API) gateway to allocate the user request to at least two of the AI models.

Specifically, the user request is based on a voice input, and the voice input is provided via a microphone.

Alternatively, the user request is based on a text input, and the text input is sourced from a prompt library.

Specifically, the device type is OAI-Mouse (Open Accelerator Infrastructure Mouse), OAI-Keyboard (Open Accelerator Infrastructure Keyboard), OAI-Pen (Open Accelerator Infrastructure Pen), or OAI-Wearable (Open Accelerator Infrastructure Wearable).

Specifically, the payment type is cash transfer, credit card payment, or electronic payment.

Conventional technologies employ a single AI model, which typically generates one result, increasing the likelihood of errors. In contrast, the present invention uses multiple AI models to generate multiple results for a user request. The user can select the most consistent result through majority voting, effectively reducing the probability of errors and achieving more accurate outcomes.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 3 is a flow diagram showing the operation steps of the multi-result AI system of FIG. 1.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
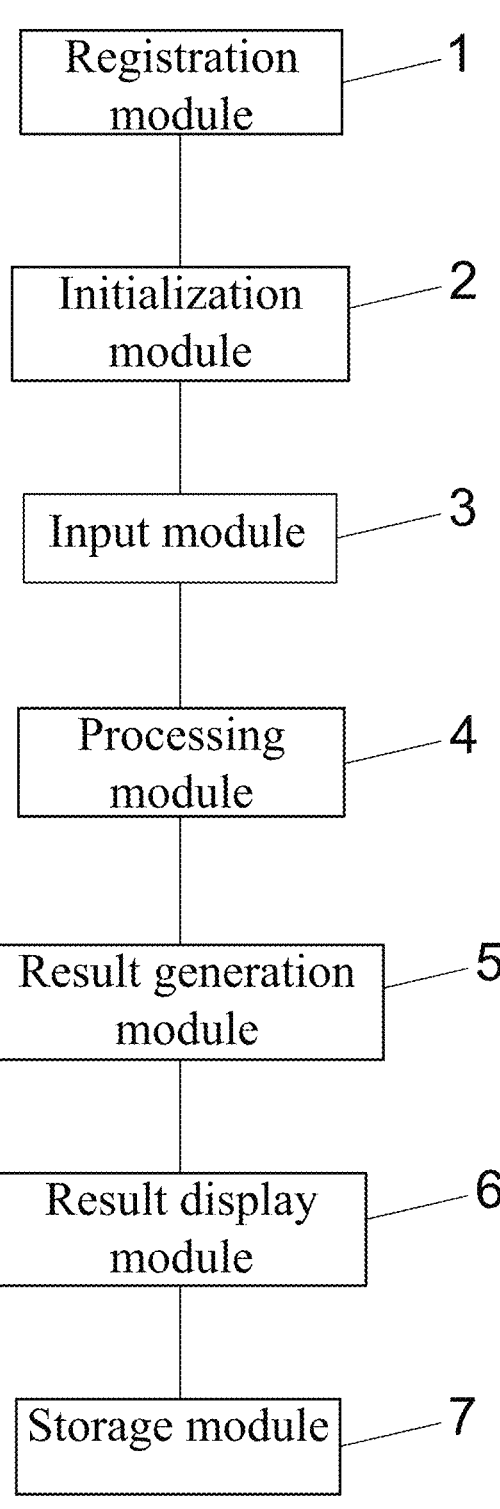
FIG. 1 is a block diagram showing the various modules of a multi-result artificial intelligence (AI) system according to an embodiment of the present invention.

As shown in FIG. 1, a Multi-Result artificial intelligent (AI) system according to an embodiment of the present invention includes the following components.

A registration module 1 is provided for users to register a device type or a payment type. The device types include OAI-Mouse (Open Accelerator Infrastructure Mouse), OAI-Keyboard (Open Accelerator Infrastructure Keyboard), OAI-Pen (Open Accelerator Infrastructure Pen), and OAI-Wearable (Open Accelerator Infrastructure Wearable), but are not limited to these. The Open Accelerator Infrastructure (OAI) is a hardware open-source organization aimed at promoting the standardization of AI hardware. The OAI-Mouse refers to a specialized mouse designed according to the standards released by Open Accelerator Infrastructure. In addition to traditional clicking and scrolling, it features AI software, sensors, wireless receivers, and other components. It supports gesture control and other innovative functions, as well as wired and wireless connectivity, enabling collaboration with various devices and platforms, such as invoking ChatGPT with a single click. The payment types include cash transfer, credit card payment, or electronic payment, but are not limited to these.

An initialization module 2 is connected to the registration module 1. The initialization module 2 configures multiple different AI models based on the registered device type or payment type, with each AI model being based on a Large Language Model (LLM). The multiple AI models include, but are not limited to, Chat Generative Pre-trained Transformer (ChatGPT), Gemini, and Shunfei. The above mentioned models are provided as examples and do not limit the scope of the present invention. Among them, ChatGPT is a conversational AI model developed by OpenAI based on a Large Language Model, and Gemini is an AI model developed by Google also based on a Large Language Model.

An input module 3 is connected to the initialization module 2 and is designed to receive a user request. The user request can be based on either voice input or text input. The voice input is provided via a microphone. The text input may be sourced from a prompt library. A prompt refers to a piece of text, a sentence, or a question provided to the AI model to guide it in responding to the query in a more accurate and comprehensive manner.

A processing module 4 is connected to the input module 3 and is responsible for distributing the user request to multiple different AI models. The processing module 4 uses an Application Programming Interface (API) gateway to allocate the user request to at least two of the AI models. The API gateway acts as an intermediary layer that processes and manages all API requests within an application. It enables traffic distribution and forwards user requests to the appropriate AI models as needed, achieving load balancing.

A result generation module 5 is connected to the processing module 4 and is responsible for generating multiple results from the user request using the various AI models.

A result display module 6 is connected to the result generation module 5 and is designed to display the multiple results.

Additionally, the system includes a storage module 7 connected to the result display module 6. The storage module 7 saves the user request and the multiple results.

Figure 2:
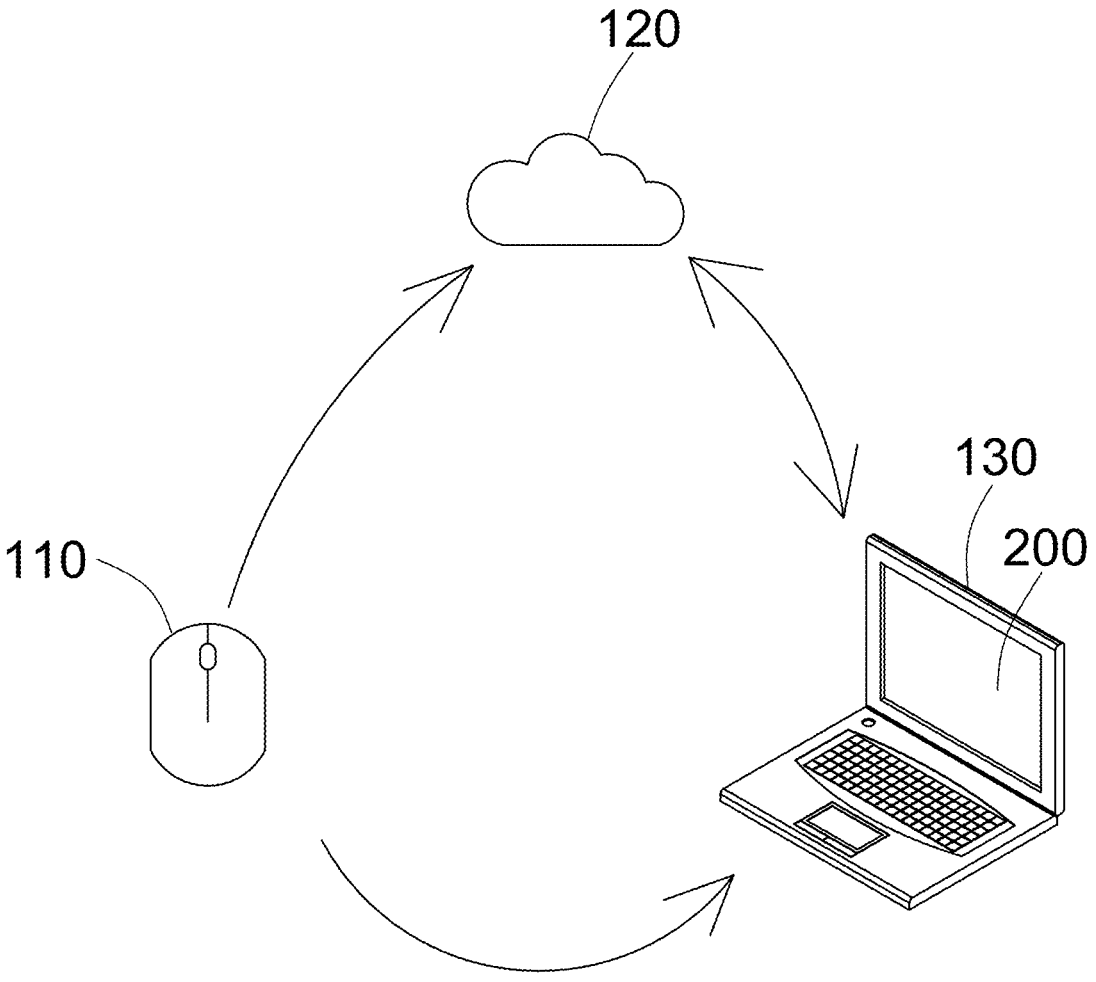
FIG. 2 is a schematic diagram depicting an application environment of the multi-result AI system of FIG. 1.

FIG. 2 depicts an application environment of the multi-result AI system of the present invention involving an AI IO device 110, a back-end device 120, and a front-end device 130. These devices collaborate to support a back-end processing. The AI IO device 110 refers to input/output IO device related to AI, designed to support data collection, processing, and output functions for AI. The AI IO device 110 may include OAI-mouse, OAI-keyboard, OAI-pen, or OAI-wearable device. The back-end device 120 may include server, storage device, router and switch, load balancer, and virtualization platform. The virtualization platform can be a cloud platform with multiple AI models, including ChatGPT, Gemini, and Shunfei. The back-end device 120 is responsible for handling requests from the front-end device 130, performing tasks such as data storage, logic processing, authentication, and computation, and returning results to the front-end device 130. The front-end device 130 refers to device or interface that directly interacts with users, used to display application content, provide user interfaces, and capture user input. The front-end device 130 may include desktop device and mobile device. Desktop devices can include desktop computer, laptop, and monitor, while mobile device can include smartphone and tablet. Back-end processing refers to handling and managing all data computations, logic processing, and data interaction operations triggered by requests from the front-end device 130. Back-end processing is closely related to the back-end device 120, which typically executes these processes as the physical hardware or infrastructure. In simple terms, back-end processing involves performing data computations, logic operations, and data interactions, while the back-end device 120 is the equipment that executes these tasks. Back-end processing includes receiving requests, processing logic, querying data, generating responses, and returning results to the front end. Receiving requests refers to the process where user requests, such as clicking a button or filling out a form, are sent to the cloud platform's server. Processing logic involves executing predefined application logic on the server after receiving the user request, such as querying databases, calculating results, or invoking other services. Querying data involves the back-end device 120 sending queries to the database if necessary and processing the results. Generating responses involves constructing a response based on the processing results. Returning results to the front end involves the back-end device 120 sending the response back to the front-end device 130, which displays the results.

Figure 5:
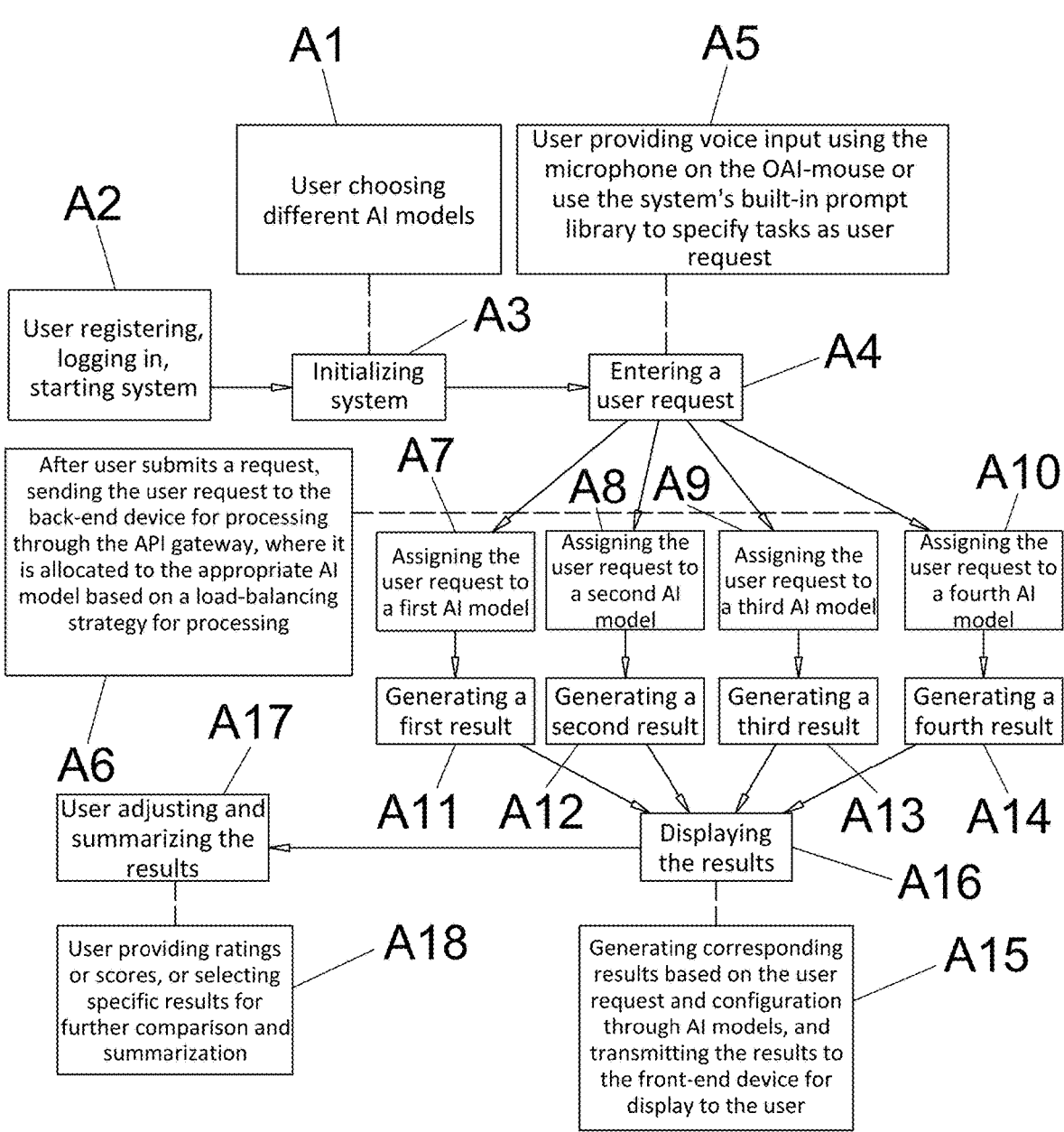
FIG. 5 provides a more detailed flow of the operation steps of the multi-result AI system of FIG. 3.

As shown in FIGS. 1, 2, 3, and 5 (where FIG. 5 is used to assist in explaining steps S1 to S5 of FIG. 3, and thus the same content will not be redundantly described), the present invention includes the following steps.

Step S1 involves configuring different AI models based on the user's device type or payment type, allowing users to customize AI models A1 as needed. In this step, the front-end device 130 and back-end device 120 work collaboratively. The front-end device 130, through the registration module 1, displays registration and login interfaces and collects user input data, including username, password, email, device type, or payment type. After the user completes the input on the front-end device 130 interface, the device type or payment type is sent to the back-end device 120. The front-end device 130 transmits the necessary registration or login data, such as username, password, email, device type, or payment type, to the back-end device 120. The back-end device 120 handles logic processing and data storage. Upon receiving the request from the front-end device 130, the back-end device 120 processes the registration or login logic accordingly.

For example, during the registration process, the back-end device 120 checks whether the username already exists and stores the new user's data (such as the encrypted password) in the database. During the login process, the back-end device 120 verifies the correctness of the username and password and typically generates an authentication token, such as a JSON Web Token (JWT), to return to the front-end device 130. Additionally, not all AI models can accept images as input. For instance, ChatGPT can process both text and images, allowing it to answer questions based on image content. Similarly, not all AI models can accept voice input. For example, Google Assistant interacts with users through voice commands, answering questions, setting reminders, and more. For instance, if a user's device type is an OAI-mouse (with a built-in microphone) and the payment type is credit card payment, the user can configure ChatGPT and Google Assistant. At this stage, ChatGPT and Google Assistant are not yet fully assigned to the user; instead, the user's device type or payment type is linked to ChatGPT and Google Assistant. These services are only fully configured and assigned to the user after successful login.

Step S2 involves the user registering, logging in, starting System A2, initializing System A3, and entering a user request A4. In this step, the front-end device 130 and back-end device 120 work collaboratively. The front-end device 130 handles system initialization, including displaying the login interface and homepage. When the user logs in, the front-end device 130 sends an initialization request to the back-end device 120 via the initialization module 2. After receiving the initialization request from the front-end device 130, the back-end device 120 configures multiple AI models based on the user's registered device type or payment type. At this point, ChatGPT and Google Assistant are fully configured and assigned to the user. User requests are initiated by the front-end device 130 and processed by the back-end device 120. The user can provide voice input using the microphone on the OAI-mouse or use the system's built-in prompt library to specify tasks as user requests A5. The front-end device 130 uses the input module 3 to capture and send user requests to the back-end device 120 for further processing.

Step S3 occurs after the user submits a request. The system sends the user request to the back-end device 120 for processing through the API gateway, where it is allocated to the appropriate AI model based on a load-balancing strategy for processing A6. When the user enters and submits a request, the system uses the processing module 4 to forward the request through the API gateway to the back-end device 120. The API gateway manages request processing and routing (routing determines how the user request is directed to multiple AI models). Depending on the type of user request and the device type, the API gateway forwards the request to the back-end device 120 for corresponding services or processing. For example, the user request may be assigned to a first AI model A7 such as ChatGPT, a second AI model A8 such as Gemini, a third AI model A9 such as Shunfei, and a fourth AI model A10 such as Google Assistant. In simple terms, a single user request can be distributed to four different AI models for processing.

Step S4 involves generating corresponding results based on the user request and configuration through AI models. These results are transmitted to the front-end device 130 for display, where the results are presented to the user. In this step, the back-end device 120 processes the user request according to specific logic, such as validating, querying the database, and performing actions using multiple AI models. Through the result generation module 5, multiple results are generated and transmitted to the front-end device 130. The front-end device 130 receives these results and uses the result display module 6 to show them to the user. For example, a first result is generated by ChatGPT A11, a second result is generated by Gemini A12, a third result is generated by Shunfei A13, and a fourth result is generated by Google Assistant A14. In simple terms, a single user request is processed by four different AI models to generate results. Afterward, the system generates results based on the user's input and configuration, transmits them to the front-end device A15, and the front-end device 130 displays the results A16.

Step S5 involves the user viewing the results produced by the AI models on the front-end device 130. The user can adjust and summarize the results A17, provide ratings or scores, or select specific results for further comparison and summarization A18.

Figure 4:
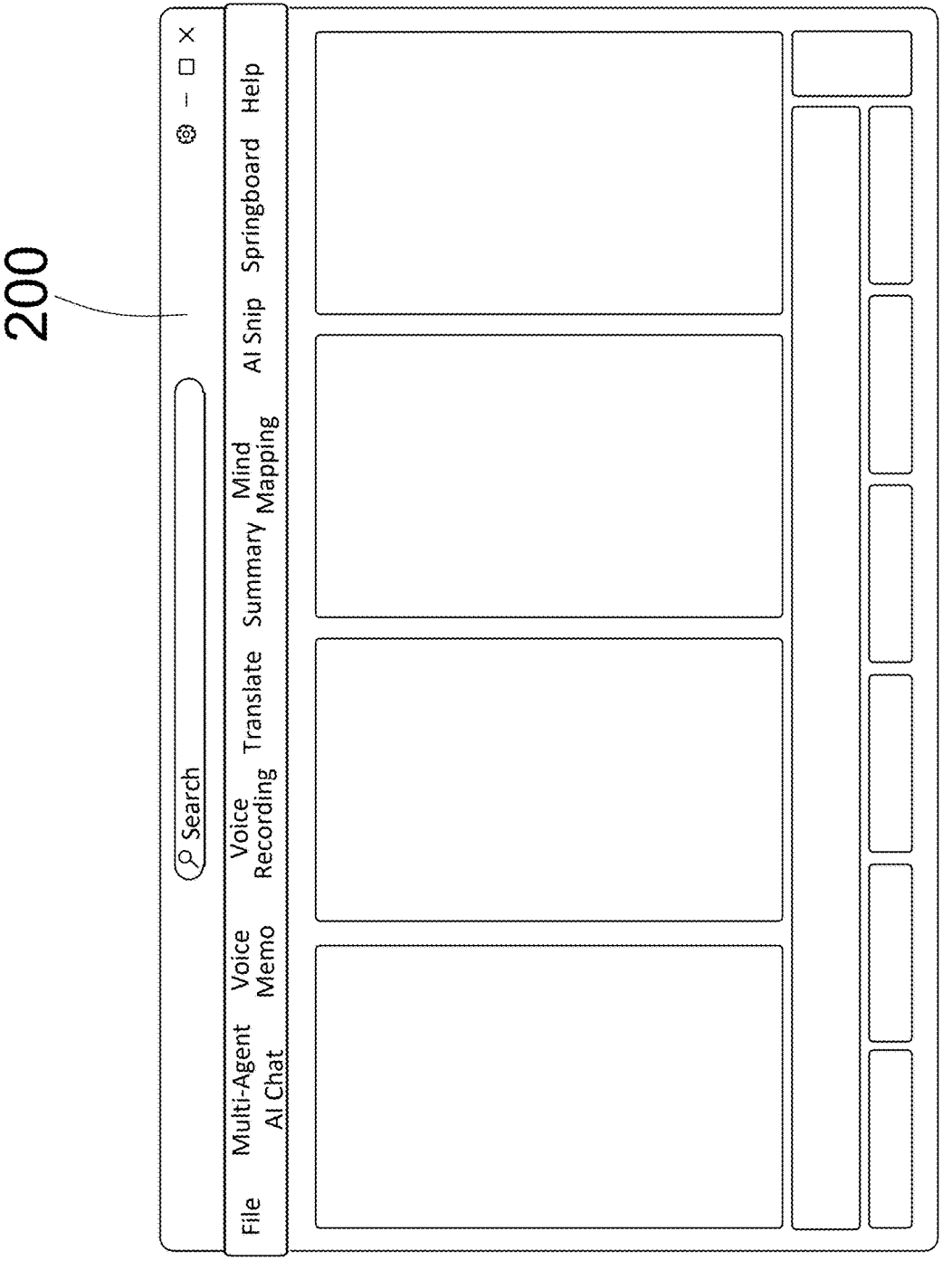
FIG. 4 illustrates a display interface of a front-end device of the multi-result AI system of FIG. 2.

Refer to FIGS. 2 and 4, where FIG. 4 illustrates the display interface 200 of the front-end device 130. The display interface 200 can accept voice or text input from the AI IO device 110 to connect to the back-end device 120, enabling access to various AI-powered applications, including A. Multi-Agent AI Chat (AMC)

B. Voice Memo

C. Voice Recording

D. Language Translation (Translate)

E. Summary

F. Mind Mapping

G. AI Snip

H. Springboard

Multi-Agent AI Chat refers to a conversational system that utilizes multiple A1 modules for interaction or collaboration. Each AI module typically has its own area of expertise or capabilities and can operate independently or work together to complete specific tasks or provide information.

Voice Memo is an application based on speech recognition and natural language processing (NLP) technology that converts voice into text, allowing for processing, storage, management, and search.

Voice Recording refers to saving voice or audio content.

Summary involves simplifying and condensing key points from a message, article, speech, or discussion.

Mind Mapping is a visual tool that organizes and presents information using graphical representations.

AI Snip is a tool or feature that uses AI technology to automatically or semi-automatically crop images. Through deep learning algorithms and computer vision techniques, it can identify different elements or areas within an image, intelligently cropping or removing unwanted parts for more precise or customized results.

Springboard allows direct login to existing AI modules.

The present invention has the following features:

1. Multi-model integration: supports multiple device types using standardized AI IO devices 110, ensuring consistent input/output specifications across various AI models.

2. Dynamic model selection: allows allocation of multiple AI models based on different users, enabling users to configure and utilize models as needed.

3. Extensibility: offers excellent scalability with the integration of additional AI models over time.

In conventional technology, a single AI model typically generates one result, increasing the likelihood of errors. In contrast, the present invention uses multiple AI models to generate multiple results for a user request. The user can select the most consistent result through majority voting, effectively reducing the probability of errors and achieving more accurate outcomes.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A multi-result artificial intelligence (AI) system, comprising:

a registration module for users to register a device type or a payment type;

an initialization module connected to the registration module, where the initialization module configures a plurality of different AI models based on the registered device type or payment type, with each AI model being based on a Large Language Model (LLM);

an input module connected to the initialization module to receive a user request;

a processing module connected to the input module for distributing the user request to the AI models;

a result generation module connected to the processing module for generating a plurality of results from the user request using the AI models; and a result display module connected to the result generation module to display the results;

wherein the device type is OAI-Mouse (Open Accelerator Infrastructure Mouse), OAI-Keyboard (Open Accelerator Infrastructure Keyboard), OAI-Pen (Open Accelerator Infrastructure Pen), or OAI-Wearable (Open Accelerator Infrastructure Wearable).

2. The multi-result AI system according to claim 1, further comprising a storage module connected to the result display module, wherein the storage module saves the user request and the results.

3. The multi-result AI system according to claim 1, wherein the AI models comprises Chat Generative Pre-trained Transformer (ChatGPT), Gemini, and Shunfei.

4. The multi-result AI system according to claim 1, wherein the processing module uses an Application Programming Interface (API) gateway to allocate the user request to at least two of the AI models.

5. The multi-result AI system according to claim 1, wherein the user request is based on a voice input; and the voice input is provided via a microphone.

6. The multi-result AI system according to claim 1, wherein the user request is based on a text input; and the text input is sourced from a prompt library.

7. The multi-result AI system according to claim 1, wherein the payment type is cash transfer, credit card payment, or electronic payment.

* * * * *